Aug. 16, 1949.  M. MARKS  2,479,501
PROTECTIVE LIGHT TRANSMITTING MEDIA
Filed March 2, 1946
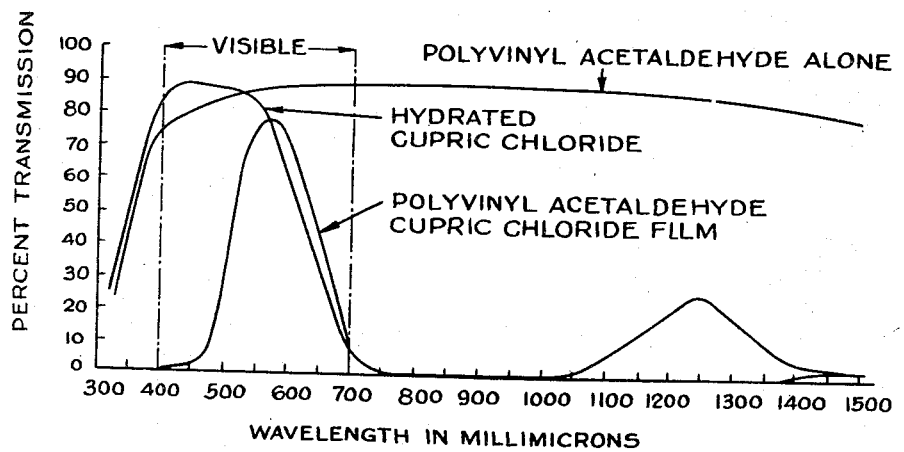
SPECTRAL TRANSMISSION CURVES
INVENTOR
Mortimer Marks
BY
Benjamin Sweedler
ATTORNEY Patented Aug. 16, 1949

2,479,501

UNITED STATES PATENT OFFICE 2,479,501

PROTECTIVE LIGHT TRANSMITTING MEDIA

Mortimer Marks, Dayton, Ohio

Application March 2, 1946, Serial No. 651,618

4 Claims. (Cl. 260—41)

This invention relates to protective light transmitting media and more particularly to media which will transmit visible light waves but will absorb invisible and harmful light waves such as infra-red and ultra-violet waves. The media embodying this invention are useful primarily in the manufacture of goggles but may be used for many other purposes such, for example, as multi-ply windshields, plastic window shades or canopies, protective coatings, packaging materials and the like.

Protective light transmitting media have long been the subject of extensive research. Glass compositions have been produced which more or less effectively eliminate infra-red and ultra-violet light waves, but the inherent characteristics of glass render it unsuitable for many purposes. For example, it is not satisfactory for use in military goggles because of restricted visual fields, limitations as to size and danger due to breakage.

While much effort has been devoted to producing a plastic composition suitable for use in goggles, to the best of my knowledge and belief, no such composition developed prior to my invention has been satisfactory either because it failed to eliminate the harmful light waves or in effecting such elimination reduced the transmission of visible light waves to such an extent that it was unsuitable for the intended purpose.

It is well known that the human eye has a peculiar response to visible light rays between the region of 400 to 700 millimicrons. Response to frequencies within this range has been determined and a curve plotted, known as the human visibility curve. A protective light transmitting medium which has light transmitting properties most nearly following the human visibility curve is best suited for visual purposes, i. e., a medium, which transmits light waves of 400 to 700 millimicrons, has a maximum transmission efficiency for light waves of about 560 millimicrons which are the light waves of peak visibility and absorbs light waves (ultra-violet) of less than 400 millimicrons, is admirably suited for optical uses.

Among the objects of this invention is to provide plastic compositions suitable for optical purposes in that they have light transmission characteristics closely approximating the human visibility curve, i. e., the compositions will not transmit harmful light waves, particularly the ultra-violet and infra-red waves, but will freely transmit visible light waves.

A further object of the invention is to provide such plastic compositions which can be produced in the form of thin sheets or films.

Still another object of the invention is to provide such plastic compositions which are relatively stable and will not be adversely affected by light, heat or moisture.

Other objects and advantages of this invention will be apparent from the following detailed description thereof.

In accordance with this invention a cupric halide or nitrate is incorporated in polyvinyl acetaldehyde, producing, I have discovered, light transmitting media which transmit visible light waves but absorb harmful light waves, particularly ultra-violet waves and infra-red waves. The resulting compositions are quite stable and therefore excellent materials for use in the manufacture of goggles or for the other uses mentioned above.

The compositions of this invention, I have discovered, have spectral or light transmission curves which closely follow the human visibility curve. This is evident from the accompanying drawing, the single figure of which shows the spectral transmission curve of a medium embodying this invention and consisting of polyvinyl acetaldehyde containing approximately 3.3% cupric chloride based on the weight of polyvinyl acetaldehyde; the cupric chloride and polyvinyl acetaldehyde being dissolved in a common solvent, namely, acetone, and the resulting composition sheeted to produce a film approximately .02" thick, which film was tested to determine its light transmitting properties and the curve of the drawing prepared on the basis of the data thus collected. This curve is indicated by the legend Polyvinyl acetaldehyde cupric chloride film. For purposes of comparison, the drawing contains two other curves, one indicated by the legend Polyvinyl acetaldehyde alone, showing the light transmitting properties of a film .02" thick of polyvinyl acetaldehyde alone, i. e. not containing any added material, and the other indicated by the legend Hydrated cupric chloride, showing the light transmitting properties of a film of hydrated cupric chloride.

It will be noted from the drawing that cupric chloride and polyvinyl acetaldehyde transmit ultra-violet light waves, i. e., neither of these media absorbs a substantial amount of ultra-violet light waves between 300 and 400 millimicrons in wave length.

Surprisingly, I have found, that by incorporating cupric chloride or other cupric halide or nitrate in the polyvinyl acetaldehyde, a light transmitting composition is produced which effectively absorbs ultra-violet and infra-red light waves. From the curve bearing the legend "Polyvinyl acetaldehyde cupric chloride film," it will be noted that this film does not transmit any light waves shorter in wave length than 400 millimicrons, almost completely absorbing frequencies between 300 and 400 millimicrons. It will be further noted that this film transmits light waves from the range of 400 to 700 millimicrons and is most efficient in transmitting light waves of approximately 550 to 650 millimicrons which include the light waves in the range of peak human visibility; hence the light transmission curves of compositions embodying this invention closely follow the human visibility curve.

These plastic compositions may be produced, for example, by partially hydrolyzing polyvinyl acetate by means of acids or alkalis as wellknown in this art and condensing the partially hydrolyzed material with acetaldehyde. For optical purposes, the polyvinyl acetaldehyde employed upon evaporation of the solvent in which it is dissolved should form solid thin films preferably of a thickness of .005" to .02" when sheeted in the customary manner, for example, by application of the solution to a polished surface.

The cupric halide incorporated in the polyvinyl acetaldehyde may be

Instead of a cupric halide, $Cu(NO_3)_2$, $Cu(NO_3)_2 \cdot 3H_2O$ or $Cu(NO_3)_2 \cdot 6H_2O$ may be used. Since the cupric salts containing water of crystallization are readily available commercially, desirably they are employed in making the light transmitting compositions of this invention.

The polyvinyl acetaldehyde and cupric salt are dissolved in a common solvent such, for example, as acetone, other ketones, ethyl acetate, other esters, normal butyl alcohol, other alcohols, a mixture of acetone and either normal butyl alcohol or ethyl acetate or other mixed ketones and esters, or other mixed ketones and alcohols; a mixture of acetone and normal butyl alcohol in the proportion of about 2 parts acetone for each part of alcohol is preferred as the solvent. Upon evaporation of the solvent, a substantial proportion of the water of crystallization is removed from the solution, producing the desired light transmitting medium. In lieu of a cupric salt containing water of crystallization, a dehydrated salt may be employed. If desired, the cupric salt may first be dissolved in a weak acid, e. g., dilute nitric acid, and the resultant solution incorporated in the solution of polyvinyl acetaldehyde. For example, cupric fluoride may be dissolved in dilute nitric acid and the resultant solution admixed with the polyvinyl acetaldehyde, or copper may be dissolved in nitric acid forming cupric nitrate in solution, and this solution added to the polyvinyl acetaldehyde solution. The amount of cupric salt incorporated in the solution of polyvinyl acetaldehyde is preferably from about 3% to about 8% by weight of cupric salt based on the weight of polyvinyl acetaldehyde to produce a film having a thickness up to .02". If a thicker film is desired, a smaller quantity of cupric salt may be used and still obtain a relatively stable light transmitting medium having the property of absorbing harmful light waves such as ultra-violet and infra-red waves.

The plastic composition embodying this invention has been found to have excellent stability to light and heat and fair resistance to water and atmospheric conditions. The compositions may be improved by adding to the solution a small precentage of ethyl silicate which functions as a hardener, i. e., results in the production of a harder film, and also improves the properties of the film with respect to resisting moisture. Further, the addition of ethyl silicate functions to improve the dispersion of the copper salts, thereby producing clearer films. Resistance of the composition to moisture may be increased by coating the surface of the film with a water resisting transparent material or by laminating the film between water resisting transparent materials.

If desired there may be added to compositions embodying this invention, plasticizers which impart to the compositions sufficient flexibility to permit flexing at all temperatures encountered in use without fracture. Among suitable plasticizers are ethyl and methyl phthalate, dibutyl and dioctyl phthalate, menthyl salicylate and phenyl salicylate. Such plasticizer may be added to the compositions at any time during the combining of the ingredients. If desired, an inhibitor to prevent crystallization of the cupric salt, particularly where relatively high concentration of salt is employed in the production of thin films, may be added to the compositions. The plasticizers hereinabove mentioned will usually function as a crystallization inhibitor, but if such plasticizer is not used or used in only limited amount, a suitable crystallization inhibitor, such as a low melting point resin, e. g., coumarone indene resin having a melting point around 10° C. or a resin of the group of biphenylpolychlorine may be incorporated in the film forming composition.

Examples of compositions embodying this invention are as follows; it will be understood the invention is not limited to these examples:

*Example 1*

| | | |
|---|---|---|
| Acetone | cc | 400 |
| Normal butyl alcohol | cc | 200 |
| Polyvinyl acetaldehyde | grms | 120 |
| $CuCl_2.2H_2O$ | grms | 7 | are mixed, producing a homogeneous solution. This solution was applied to form a film of approximately .02" thick, the light transmitting properties of which are indicated by the curve bearing the legend Polyvinyl acetaldehyde cupric chloride film.

*Example 2*

| | | |
|---|---|---|
| Acetone | cc | 600 |
| Ethyl acetate | cc | 300 |
| Polyvinyl acetaldehyde | grms | 250 |
| Methyl salicylate plasticizer | cc | 25 |
| and | | |
| $CuCl_2.2H_2O$ | grms | 5.5 | are mixed, producing a homogeneous solution.

In the compositions of the above examples, cupric nitrate, cupric bromide, cupric iodide or cupric fluoride may be substituted for the cupric chloride without materially affecting the light transmitting properties of the resulting composition. To these compositions may be added ethyl silicate to produce a film which is somewhat more resistant to water penetration and of somewhat improved clarity; the amount of ethyl silicate added may be approximately 3% by weight of the polyvinyl acetaldehyde and cupric chloride.

The compositions of this invention may be cast or molded in any suitable manner for imparting the desired form to the light transmitting media.

The solutions may be cast in sheet or film form by pouring them on a hard polished surface such as glass, distributing the solutions over the surface in the desired thickness and permitting the solutions to solidify through evaporation of the solvent, for example, by causing dry air to flow over the surface. Light transmitting media of this invention may be produced by preparing a solution of all the ingredients in a common solvent and then casting the solution in the desired form, but the ingredients may be combined in any other manner. For example, the cupric salt and the plasticizer may be dissolved in a common solvent and the polyvinyl acetaldehyde in the form of a transparent sheet exposed to the action of the solution thus produced by dipping the sheet in the solution or otherwise applying the solution to the surface thereof. The solvent will quickly soften the polyvinyl acetaldehyde, without disintegrating the same, sufficiently to permit the dissolved ingredients to penetrate the plastic sheet and to be thus absorbed and uniformly distributed therein in the desired concentration.

While the reason for the improved results obtained by the incorporation of a cupric halide or nitrate in polyvinyl acetaldehyde is not positively known, it is believed that a reacton takes place between the cupric salt and the polyvinyl acetaldehyde forming a new compound which has the advantageous light transmitting properties hereinabove set forth. More specifically, polyvinyl acetaldehyde contains hydroxyl groups which react with the copper salts forming addition compounds having the advantageous light transmitting properties hereinabove set forth; these hydroxyl groups are derived from the polyvinyl alcohol, the hydroxyl groups remaining unreacted when the alcohol is hydrolyzed and then condensed with acetaldehyde. The amount of these hydroxyl groups in the polyvinyl acetaldehyde is small, of the order of 1.5% by weight of the polyvinyl acetaldehyde. Although there is good reason to believe that the above theory is correct, it is to be understood that this invention is not to be limited by any statements of theory or explanation.

This application is a continuation in part of my application Serial No. 579,295, filed February 22, 1945 now abandoned.

Since changes may be made without departing from the scope of the invention, it is intended that the above description should be interpreted in an illustrative and not in a limiting sense.

Having now fully described my invention, what I claim as new and desire to secure by Letters Patent, is:

1. A composition of matter which transmits visible light waves but absorbs infra-red and ultra-violet light waves, comprising polyvinyl acetaldehyde and from 3% to 8% based on the weight of polyvinyl acetaldehyde of cupric chloride.

2. A film of polyvinyl acetaldehyde of a thickness not exceeding .02" containing from about 3% to about 8% by weight of a cupric halide.

3. A film of polyvinyl acetaldehyde of a thickness not exceeding .02" containing from about 3% to about 8% by weight of cupric chloride.

4. A film of polyvinyl acetaldehyde of a thickness not exceeding .02", containing from 3% to 8% by weight of a cupric salt of the group consisting of cupric halides and cupric nitrate and ethyl silicate.

MORTIMER MARKS.

REFERENCES CITED

The following references are of record in the file of this patent:

UNITED STATES PATENTS

| Number | Name | Date |
| --- | --- | --- |
| 1,666,047 | Jones | Apr. 10, 1928 |
| 1,962,132 | Bradshaw | June 12, 1934 |
| 2,172,249 | Lowry | Sept. 5, 1939 |
| 2,317,891 | Dennison | Apr. 27, 1943 |
| 2,356,849 | Horback | Aug. 29, 1944 |